United States Patent
Ichimura (10) Patent No.: US 6,496,573 B1
(45) Date of Patent: Dec. 17, 2002

(54) COMMUNICATIONS APPARATUS AND COMMUNICATION METHOD

(75) Inventor: Norihiko Ichimura, Kanagawa (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/430,751

(22) Filed: Oct. 29, 1999

(30) Foreign Application Priority Data

Apr. 1, 1999 (JP) .......................................... 11-094677

(51) Int. Cl.[7] .............................................. H04M 11/00
(52) U.S. Cl. .................. 379/100.06; 358/435; 358/442; 358/402; 379/100.08
(58) Field of Search ....................... 379/100.08, 100.06, 379/100.01; 358/402, 401, 405, 407, 434, 442

(56) References Cited

U.S. PATENT DOCUMENTS

| | | | |
|---|---|---|---|
| 5,461,488 A | * 10/1995 | Witek | 358/402 |
| 5,790,639 A | 8/1998 | Ranalli et al. | |
| 5,881,233 A | 3/1999 | Toyoda et al. | |
| 5,892,591 A | * 4/1999 | Anglin, Jr. et al. | 358/407 |
| 6,025,931 A | * 2/2000 | Bloomfield | 358/402 |
| 6,119,142 A | * 9/2000 | Kosaka | 358/400 |

FOREIGN PATENT DOCUMENTS

| | | |
|---|---|---|
| EP | 0835011 | 4/1998 |
| EP | 0898410 | 2/1999 |

* cited by examiner

*Primary Examiner*—Stella Woo
(74) *Attorney, Agent, or Firm*—Greenblum & Bernstein, P.L.C.

(57) ABSTRACT

A communications apparatus connected to a network, such as the Internet or a LAN, includes an input system for inputting image data, a transmitter that transmits the image data via e-mail, a receiver that receives a reply related to the transmission, and a communication control memory. The communications control memory stores a transmit result indicating whether the transmitting device has completed the transmission and a delivery result indicating whether a destination side apparatus has received the transmission. Both the results are stored along with their correspondence to each other. A communication method utilizing this communications apparatus is also provided. The apparatus and the method allow users to confirm completion of transmission and delivery to a destination with ease and without fail by storing a notice of completing the transmission as well as information about a return mail into the communication control memory in the apparatus on the transmitter side.

8 Claims, 9 Drawing Sheets

| NO. | FILE No. | DATE | TIME | NUMBER OF SENT SHEETS | ADDRESS | TRANSMISSION TIME | TRANSMIT RESULT | DELIVERY RESULT | TRANSMIT METHOD |
|---|---|---|---|---|---|---|---|---|---|
| 00 | 001 | 01-20 | 08:30 | 003 | ABC@DEF.rdmg.mgcs.mei.co.jp | 00:00'30 | OK | OK | Internet |
| 01 | 002 | 01-20 | 09:35 | 001 | FAX@ifax001.rdmg.mgcs.mei.co.jp | 00:00'09 | OK | -- | Internet |
| 02 | 003 | 01-20 | 11:16 | 005 | 03-5434-7088 | 00:09'35 | | OK | PSTN |
| 03 | 004 | 01-20 | 11:48 | 003 | 03-5434-7166 | 00:05'06 | | OK | PSTN |
| 04 | 005 | 01-20 | 15:13 | 001 | XYZ@rdnn.mgcs.mei.co.jp | 00:00'16 | OK | 712 | Internet |
| 05 | 006 | 01-20 | 16:01 | 002 | Test@rdmg.mgcs.mei.co.jp | 00:00'22 | OK | | Internet |
| ... | | | | | | | | | |
| ... | | | | | | | | | |
| ... | | | | | | | | | |

FIG.1 Prior Art

Communication Results

| NO. | RESULT | NUMBER OF SHEETS | FILE NUMBER | TRANSMISSION TIME | ADDRESS | MODE | DATE | TIME | COMM. CODE |
|---|---|---|---|---|---|---|---|---|---|
| 13 | OK | 001/001 | 136 | - - : - - ' - - | PAN52194@pas.mei.co.jp | RCVD | 01-06 | 09:52 | LAN |
| 14 | R-OK | 001/001 | 136 | 00:00'21 | Tel 3434-8550 | XMIT | 01-06 | 11:25 | C8444B577000 |
| 15 | - - | | 136 | - - : - - ' - - | kitagawa@tde.ad.jp | XMIT | 01-06 | 15:26 | 01 address LAN |
| 16 | OK | 001/001 | 137 | - - : - - ' - - | | RCVD | 01-06 | 16:45 | LAN |
| 17 | R-OK | 001/001 | 137 | 00:00'29 | Tel 045-652-3268 | XMIT | 01-07 | 08:45 | C8444B577000 |
| 18 | 712 | 001/001 | 137 | - - : - - ' - - | | XMIT | 01-07 | 10:38 | 01 address LAN |
| 19 | OK | 001/001 | 138 | - - : - - ' - - | | RCVD | 01-07 | 14:12 | LAN |
| 20 | R-OK | 001/001 | 138 | 00:00'30 | Tel 044-625-2358 | XMIT | 01-07 | 18:22 | C8444B577000 |
| 21 | 712 | 001/001 | 138 | - - : - - ' - - | | XMIT | 01-08 | 11:11 | 01 address LAN |
| 22 | OK | 001/001 | 139 | 00:00'30 | Tel 7-374-2906 | XMIT | 01-08 | 11:47 | C8444B577000 |
| 23 | OK | 001/001 | 140 | - - : - - ' - - | ken@rdng.mei.co.jp | RCVD | 01-08 | 13:21 | LAN |
| 24 | R-OK | 001/001 | 140 | 00:00'30 | Tel 5231-9642 | XMIT | 01-09 | 09:33 | C8444B577000 |
| 25 | - - | | 140 | - - : - - ' - - | kitagawa@tde.ad.jp | XMIT | 01-10 | 16:33 | 01 address LAN |
| 26 | OK | 001 | 141 | 00:00'34 | Miyata Shokai | RCVD | 01-10 | 17:22 | C8444B577000 |
| 27 | OK | 006 | 142 | | Asahi Co. Ltd | RCVD | 01-11 | 11:35 | C8444B577000 |
| 28 | OK | 001/001 | 143 | - - : - - ' - - | PAN52194@pas.mei.co.jp | RCVD | 01-11 | 13:25 | LAN |
| 29 | R-OK | 001/001 | 143 | 00:00'36 | Tel 3434-8550 | XMIT | 01-12 | 17:35 | C8444B577000 |
| 30 | OK | 001/001 | 144 | 00:00'43 | Tel 7-374-2906 | XMIT | 01-13 | 12:33 | C8444B577000 |

FIG.2  Prior Art

```
Received: from Internet FAX (ifax 002.rdmg.mgcs.mei.co.jp (133.185.247.583)) by ifeifl.rdmg.mgcs.mei.co.jp (8.6.12/3.4W3)
    with SMTP id JAA18798 for <FAX@IFAXP73.RDMG.MGCS.MEI.CO.JP>;Wed. 13 Jan 1999 09:33:34 +0900
Date: Wed. 13 Jan 1999 09:33:34 +0900
Message-Id: <199901130033.JAA18798@ifeifl.rdmg.mgcs.mei.co.jp>
Mime-Version: 1.0
Content-Type: multipart/mixed:boundary "-+-+-+WGCS+-+-+-"
X-Mailer: Internet FAX. MGCS
From: fax@ifax002.rdmg.mgcs.mei.co.jp
Subject: Internet FAX Return Receipt
To: FAX@IFAXP73.RDMG.MGCS.MEI.CO.JP -+-+-+MGCS+-+-+-
Content-Type: text/plain:charset=us ascii

* * * * *  Internet FAX Return Receipt  * * * * *

From    : FAX@IFAXP73.RDMG.MGCS.MEI.CO.JP
To      : fax@ifax002
Subject : IMAGE from Internet FAX Status      Pages           Date
OK          1               Jan-13-1999  10:15

* * * * * * * * * * * * * * * * * * * * * *

1999-01-13  10:16  FROM Pat. Div.    TO    Reserch Lab.                                      P. 01/01

TEST  PATTERN
```

TRANSMISSION MAIL HEADER PORTION

```
Received : from rdmg.mgcs.mei.co.jp(m1sv2.rdmg.mgcs.mei.co.jp)by popm 1
        (4.1/16.2)idAA12915:Tue. 19. Jan 99 15:044:33 JST
Received : from ifwtoyo.rdmg.mgcs.mei.co.jp
        by rdmg.mgcs.mei.co.jp(SMI-8.6/3.5Wp17-98041012)with SMTP id
        OAA11778:Tue. 19. Jan 1999 14:56:46 +0900
Received : from Internet FAX (ifaxp73.rdmg.mgcs.mei.co.jp [133.185.249.229] ) by
ifwtoyo.rdmg.mgcs.mei.co.jp (8.7.4+2.6Wbeta6) with SMTP id OAA21268 for
<fax@ifax001.rdmg.mgcs.mei.co.jp>:Tue.19 Jan 1999 14:26:42 +9000 (JST)
Date : Tue. 19 Jan 1999 14:26:42 +0900 (JST)
Message-ID : <199901190526.OAA21268@ifwtoyo.rdmg.mgcs.mei.co.jp>
X-Mailer : Internet FAX. MGCS
X-Info : TRANSMISSION FILE No. + DATE + TIME
Mime-Version : 1.0
Content-Type : multipart/mixed: boundary="+-+-+-MGCS-+-+-+"
Subject : IMAGE from Internet FAX
To : fax@ifax001.rdmg.mgcs.mei.co.jp
From : FAX@IFAXP73.RDMG.MGCS.MEI.CO.JP
Status : U
```

FIG. 6a

| NO. | FILE No. | DATE | TIME | NUMBER OF SENT SHEETS | ADDRESS | TRANSMISSION TIME | TRANSMIT RESULT | DELIVERY RESULT | TRANSMIT METHOD |
|---|---|---|---|---|---|---|---|---|---|
| 00 | 001 | 01-20 | 08:30 | 003 | ABC@DEF.rdmg.mgcs.mei.co.jp | 00:00'30 | OK | OK | Internet |
| 01 | 002 | 01-20 | 09:35 | 001 | FAX@ifax001.rdmg.mgcs.mei.co.jp | 00:00'09 | OK | - | Internet |
| 02 | 003 | 01-20 | 11:16 | 005 | 03-5434-7088 | 00:09'35 | | OK | PSTN |
| 03 | 004 | 01-20 | 11:48 | 003 | 03-5434-7166 | 00:05'06 | | OK | PSTN |
| 04 | 005 | 01-20 | 15:13 | 001 | XYZ@rdnn.mgcs.mei.co.jp | 00:00'16 | OK | | Internet |
| 05 | 006 | 01-20 | 16:01 | 002 | Test@rdmg.mgcs.mei.co.jp | 00:00'22 | OK | 712 | Internet |
| ... | | | | | | | | | |
| ... | | | | | | | | | |

FIG. 6b

| NO. | FILE No. | DATE | TIME | NUMBER OF RECVED SHEETS | ADDRESS | TRANSMISSION TIME | HEADER INFORMATION | RECEIVED RESULT | TRANSMIT METHOD |
|---|---|---|---|---|---|---|---|---|---|
| 00 | 001 | 01-20 | 08:30 | 003 | ABC@DEF.rdmg.mgcs.mei.co.jp | 00:00'30 | | OK | PSTN |
| 01 | 002 | 01-20 | 09:35 | 001 | FAX@ifax001.rdmg.mgcs.mei.co.jp | 00:00'09 | X-Info+From | OK | Internet |
| 02 | 003 | 01-20 | 11:16 | 005 | 03-5434-7088 | 00:09'35 | X-Info+From | OK | Internet |
| 03 | 004 | 01-20 | 11:48 | 003 | 03-5434-7166 | 00:05'06 | | OK | PSTN |
| ... | | | | | | | | | |
| ... | | | | | | | | | |

FIG.7

ANSWER MAIL HEADER PORTION

```
Received : from Internet FAX (ifax001.rdmg.mgcs.mei.co.jp [133.185.247.57] ) by
ifeif1.rdmg.mgcs.mei.co.jp (8.6.12/3.4W3) with SMTP id JAA 18820
for <FAX@IFAX73.RDMG.MGCS.MEI.CO.JP>:Wed. 13 Jan 1999 09:49:14 +9000
Date : Wed. 13 Jan 1999 09:49:14 +0900
Message-ID : <19901130049.JAA18820@ifeif1.rdmg.mgcs.mei.co.jp>
Mime-Version : 1.0
Content-Type : multipart/mixed: boundary="-+-+-+MGCS+-+-+-"
X-Mailer : Internet FAX. MGCS
X-Confirmation : Sending From Internet FAX, MGCS
X-Reinfo : TRANSMISSION FILE No. + DATE + TIME + RECEIVED CONTENTS
From : fax@ifax001.rdmg.mgcs.mei.co.jp
Subject : Internet FAX Return Receipt
To : FAX@IFAXP73.RDMG.MGCS.MEI.CO.JP
```

FIG.8

| NO | TRANSMIT RESULT | DELIVERY RESULT | NUMBER OF RECVED SHEETS | FILE No. | COMM. TIME | MODE | ADDRESS | DATE | TIME | TRANS. CODE |
|---|---|---|---|---|---|---|---|---|---|---|
| 01 |  | OK | 001/001 | 001 | --:--'-- | RECEIVE | ABC@rdmg.mgcs.mei. | 01-06 | 10:00 | LAN |
| 02 | OK |  | 001/001 | 002 | 00:00'21 | TRANSMIT | TEL 03-5434-7008 | 01-06 | 10:16 | C8444B8577000 |
| 03 | OK |  | 001/001 | 003 | --:--'-- | TRANSMIT | xyz@rdmg.mgcs.mei. | 01-06 | 12:10 | LAN |
| 04 |  | OK | 003/003 | 004 | 00:01'27 | RECEIVE | Matsusita Graphic Comm | 01-06 | 17:20 | C0520B0577000 |
| 05 | OK |  | 002/002 | 005 | 00:00'20 | TRANSMIT | xyz@rdmg.mgcs.mei. | 01-12 | 12:12 | LAN |
| 06 | OK |  | 001/001 | 006 | 00:00'05 | TRANSMIT | test@rdmg.mgcs.mei. | 01-12 | 13:21 | LAN |
| 07 | OK | 712 | 001/001 | 007 | 00:00'05 | TRANSMIT | xxx@AAA.co.jp | 01-13 | 13:00 | LAN |
| ⋮ | ⋮ | ⋮ | ⋮ | ⋮ | ⋮ | ⋮ | ⋮ | ⋮ | ⋮ | ⋮ |

COMMUNICATIONS APPARATUS AND COMMUNICATION METHOD

CROSS-REFERENCE TO RELATED APPLICATIONS

The present invention relates to the subject matter contained in Japanese Patent Application No. 11-094677, filed on Apr. 1, 1999, the disclosure of which is expressly incorporated by reference herein in its entirety.

BACKGROUND OF THE INVENTION

1. Field of the Invention

The present invention relates to a communications apparatus such as a facsimile machine which utilizes the Internet or a LAN (local area network), and a communication method employing this apparatus. The present invention particularly relates to a communications apparatus which allows users to confirm a delivery result, and a method for confirming the delivery result.

2. Background and Material Information

A conventional communications apparatus, e.g., a facsimile machine, indicates "data transmitting" on its display panel during a transmission, and when it completes the transmission, this display disappears. Users determine that the data has been successfully transmitted when the display disappears, or when the machine does not print a "non-delivery" message within a certain period after the transmission.

On the other hand, a facsimile machine linked to the Internet is unable to confirm whether the data has been transmitted correctly and users must assume the data has been successfully transmitted when the transmission is completed. In this respect, facsimiles sent via the Internet are different from facsimiles sent via the PSTN (public switched telephone network). The users thus ask the destination (i.e., recipient) to send a return mail (i.e., e-mail) from the destination-side facsimile machine linked to the Internet to confirm receipt of the data. The users print out the return mail upon receipt to confirm the acknowledgment.

Figure 1:
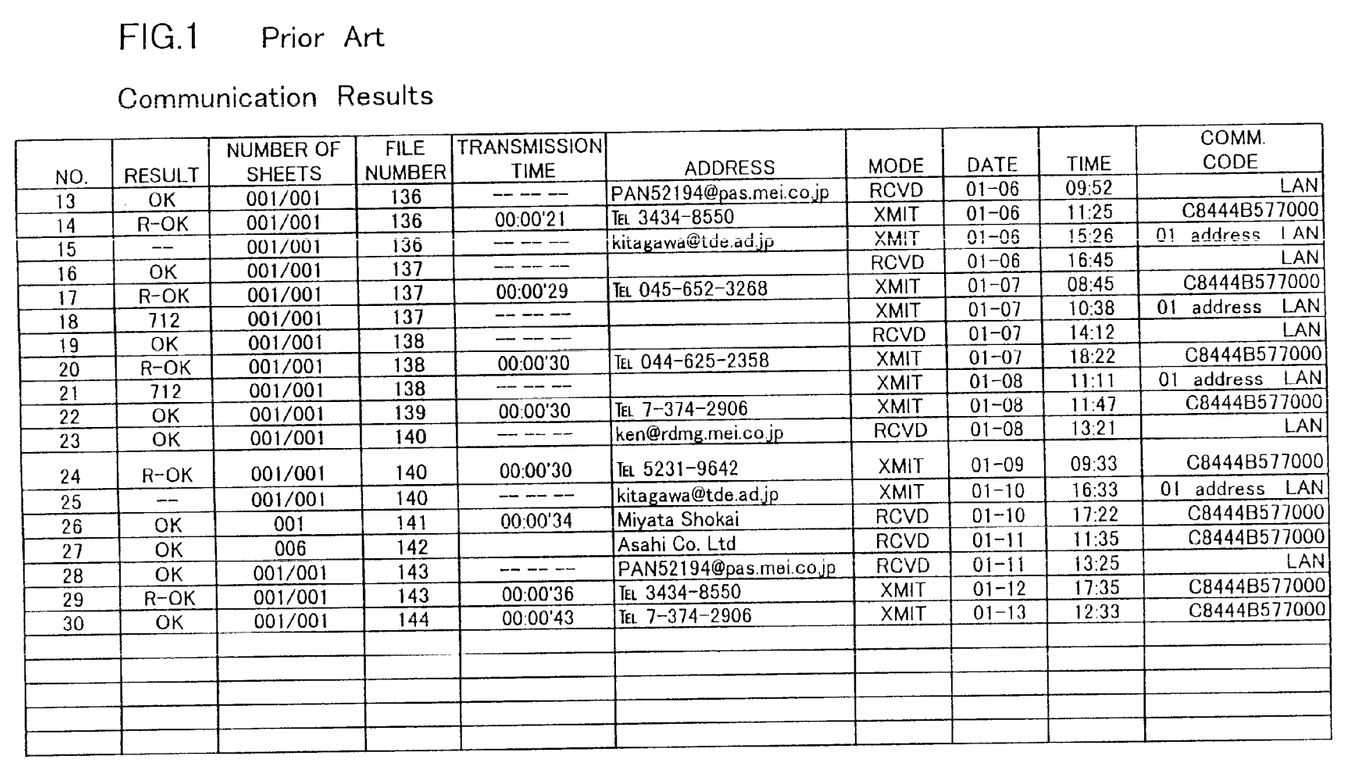
FIG. 1 depicts an output screen showing an acknowledgment of data transmitted by a conventional facsimile machine linked to the Internet.
Figure 2:
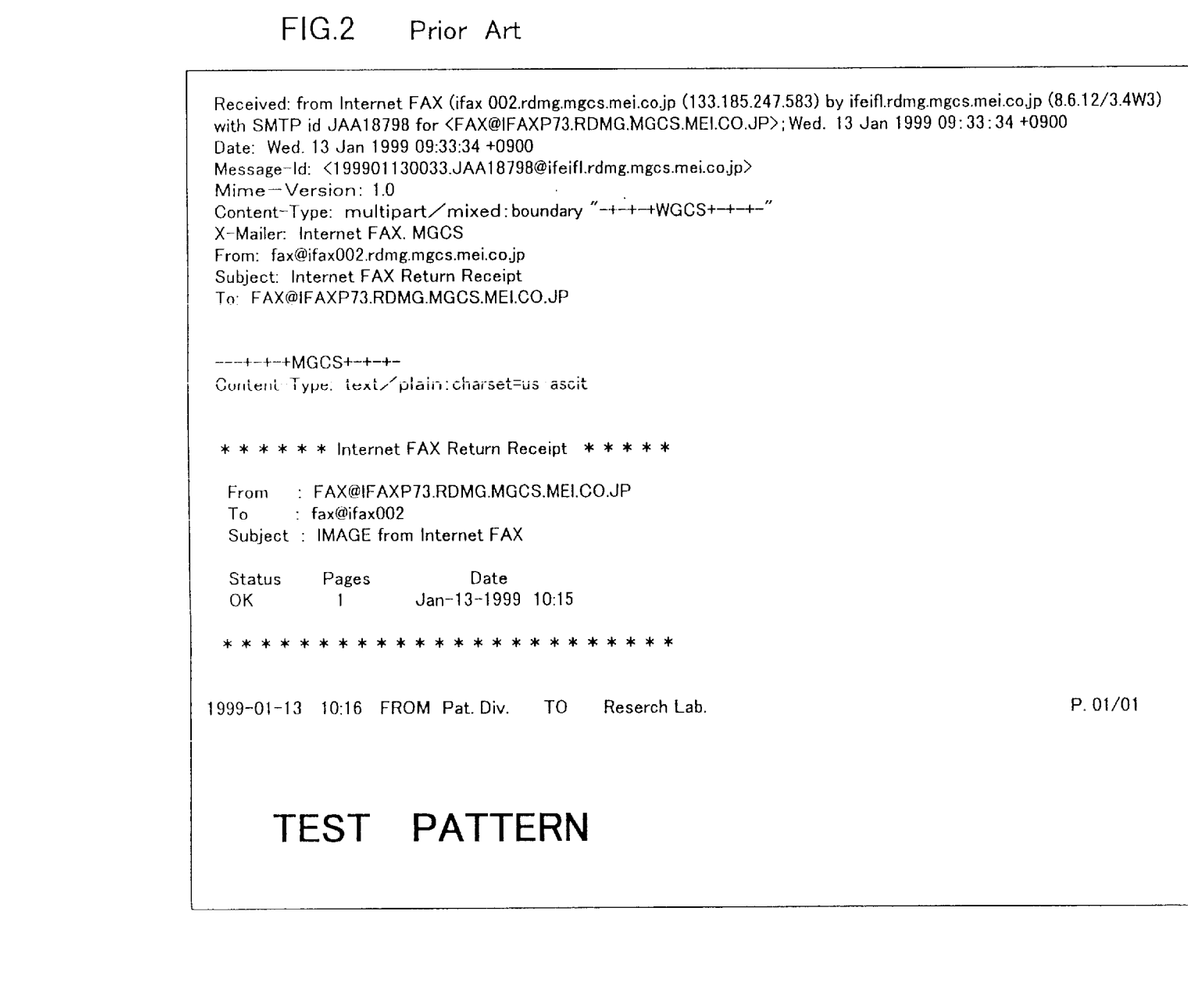
FIG. 2 depicts a screen showing an output of a return mail from a conventional destination-side facsimile machine linked to the Internet.

FIG. 1 depicts an output format that acknowledges the data transmission by a conventional facsimile machine linked to the Internet. As shown in FIG. 1, users can acknowledge facsimile transceiving by "OK" (as examples No. 22 and 26 show) and confirm a relay transmission by "R-OK" (as examples No. 14 and 24 show). However, during LAN communications, although receipt of e-mail is acknowledged by "OK" (as example No. 13 shows), transmission of e-mail does not have any means for acknowledgment, as seen in example No. 15 which indicates "- -". Thus, data has been transmitted without an acknowledgment. An output format as shown in FIG. 2 is thus returned from the destination-side facsimile machine linked to the Internet, and the format is printed to confirm the acknowledgment.

The conventional facsimile machine discussed above requires a printout every time a facsimile is transmitted through the LAN, and this printout can be mingled with other receipt data. The confirmation of acknowledgment is thus cumbersome work, and if this printout is discarded, it is difficult to confirm the acknowledgment.

SUMMARY OF THE INVENTION

The present invention addresses the problems discussed above, and aims to provide a communications apparatus and method that allow users to confirm completion of a transmission as well as an acknowledgment of the communication through the Internet or a LAN.

In order to achieve this objective, in a communication through the Internet or the LAN, the present invention stores notices of data transmission and data of return mails in a communication control memory provided in a communications apparatus on the transmitter side. The data transmission can thus be confirmed and acknowledged by monitoring the stored data.

According to an aspect of the present invention, a communications apparatus includes an input system that inputs image data, and a transmitter that transmits the image data input by the input system through e-mail. The apparatus also includes a receiver that receives a reply corresponding to the transmission sent by the transmitter, and a storage or memory. The memory stores a transmit result indicating whether the transmission was successfully completed and a delivery result received by the receiver. Both the results are stored in correlation with each other. According to another aspect of the present invention, the apparatus may also include a facsimile transceiver that transmits and receives image data. In another embodiment, the transmitter and the receiver are coupled to a network line, for example the Internet.

The memory may include a table memory that stores the transmit result, which indicates that the e-mail has been successfully transmitted, and a delivery result indicating that the e-mail has been successfully delivered to a destination. Both the results are stored in correlation with each other. The memory may also store certain information independently. Such information includes the delivery result, which indicates that the e-mail has been delivered, time-out information indicating that the e-mail failed to be delivered within a predetermined period, and a waiting status indicating that the apparatus is awaiting the delivery result.

According to another embodiment, when the transmitted e-mail is an error mail, an error code is noticed as the delivery result to the apparatus. According to another embodiment, a transmission time is recorded in the memory.

According to another embodiment, the apparatus also includes a facsimile transceiver. Further, the memory stores the transmit result and the delivery result of the e-mail as well as a transmit result and a receipt result of a facsimile communication. The transmit result and the receipt result of the facsimile communication are recorded in a transmit result column and a delivery result column, respectively, of a table memory in the memory. The apparatus may also include a display that displays information stored in the memory on either a screen or a printed form.

According to another aspect of the present invention, a communications apparatus includes an input system that inputs image data, and a production system that produces a mail header. The apparatus also includes a memory that stores the image data and the mail header, and a mail transmitter that transmits the image data and the mail header stored in the memory through a network line. The apparatus also includes a first memory that stores a transmit result in the memory, a second memory that analyzes a mail header of a return mail from a destination and stores an analysis result in the memory, and an output system that outputs the transmit result and the analysis result from the memory.

According to another aspect of the present invention, a communications apparatus utilizing a network line includes a transmitter that transmits image data via e-mail, a receiver that receives a return mail corresponding to the transmitted e-mail, and a memory. The memory stores header information from the transmitted mail, a notice of transmission completion, and header information from the return mail.

According to another aspect of the present invention, a communication method includes inputting image data, and transmitting the image data together with mail header information as an e-mail via a network line. The method also includes storing a reply e-mail corresponding to the transmitted e-mail, and analyzing and storing a mail header from the reply e-mail received from a destination.

According to yet another aspect of the present invention, a communication method includes inputting an image to be transmitted as image data, and transmitting the image data together with mail header information as an e-mail via a network line. The method also includes storing a transmission result of the transmitted e-mail in a memory, analyzing and storing a mail header from a return e-mail received from a destination in the memory, and outputting the transmission result and return mail information from the memory.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout the several views of the drawing, and wherein.

DETAILED DESCRIPTION OF THE PREFERRED EMBODIMENTS

An exemplary embodiment of the present invention is described hereinafter with reference to the accompanying drawings.

Figure 3:
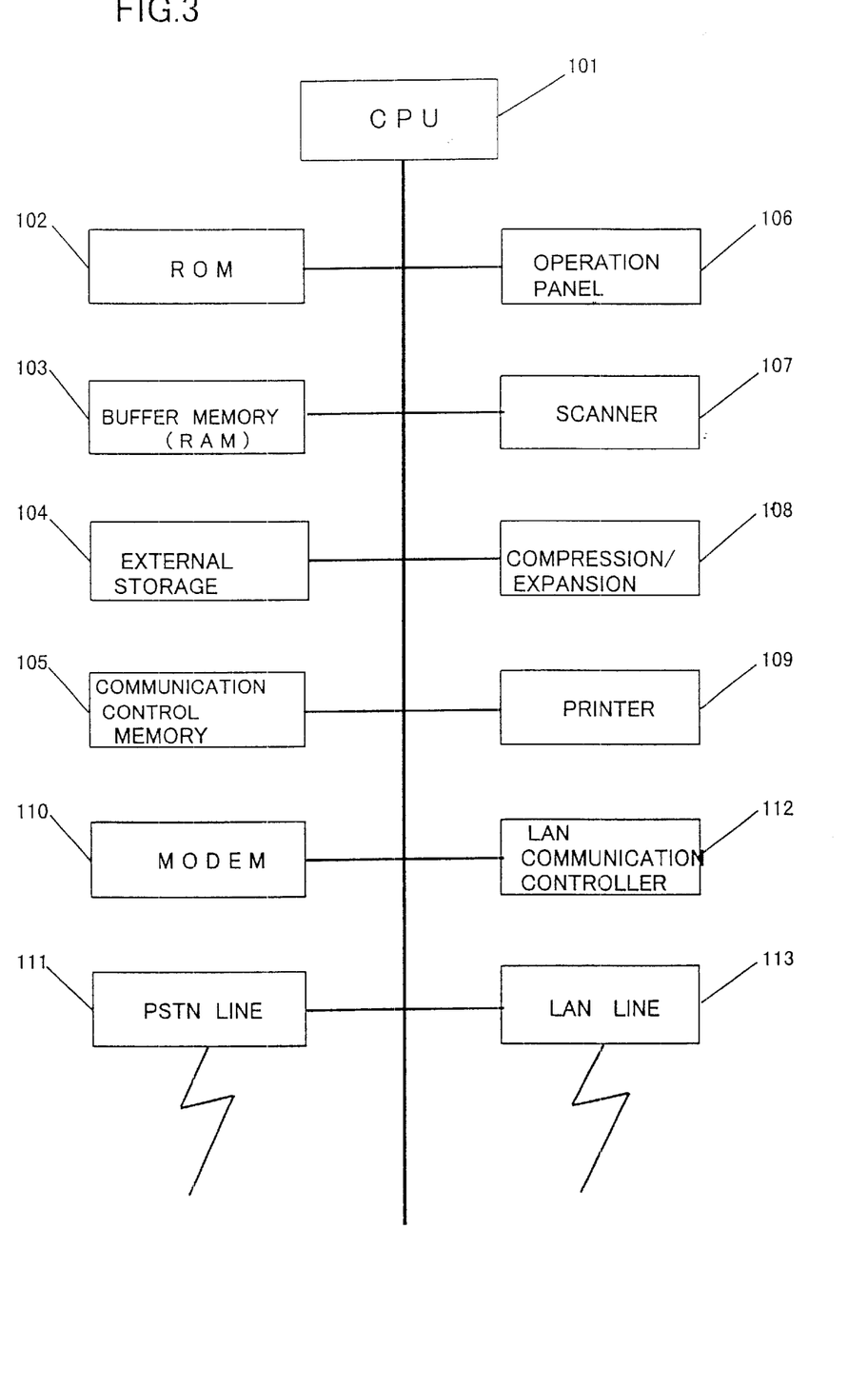
FIG. 3 is a block diagram illustrating in schematic form a basic structure of a communications apparatus of the present invention.

FIG. 3 is a block diagram depicting, in schematic form, an exemplary structure of a communications apparatus in accordance with an exemplary embodiment of the present invention. The communications apparatus used in this embodiment is a facsimile machine that accommodates both Internet and PSTN communications, i.e., an integrated facsimile machine. This machine comprises the following elements:

(a) scanner 107 through which image data is fed;
(b) printer 109 for printing the received image signal as a visible image;
(c) facsimile transceiver 114 for transmitting and receiving facsimile data via PSTN line 111; and
(d) data converter 115 for converting e-mail data into facsimile data and vice versa.

This Internet facsimile machine allows image data to be transmitted and received by either e-mail or facsimile. This Internet facsimile machine operates as follows: Initially, a mail address of a destination is input and a start button on an operation panel 106 is pressed. Then scanner 107 reads the mail and converts it into e-mail data, which is transmitted by e-mail. Another operation of the machine includes initially inputting a facsimile telephone number, and pressing a start button on the operation panel 106. The scanner 107 then reads the mail and converts it into facsimile data, which is transmitted in the manner of a usual facsimile transmission.

Figure 4:
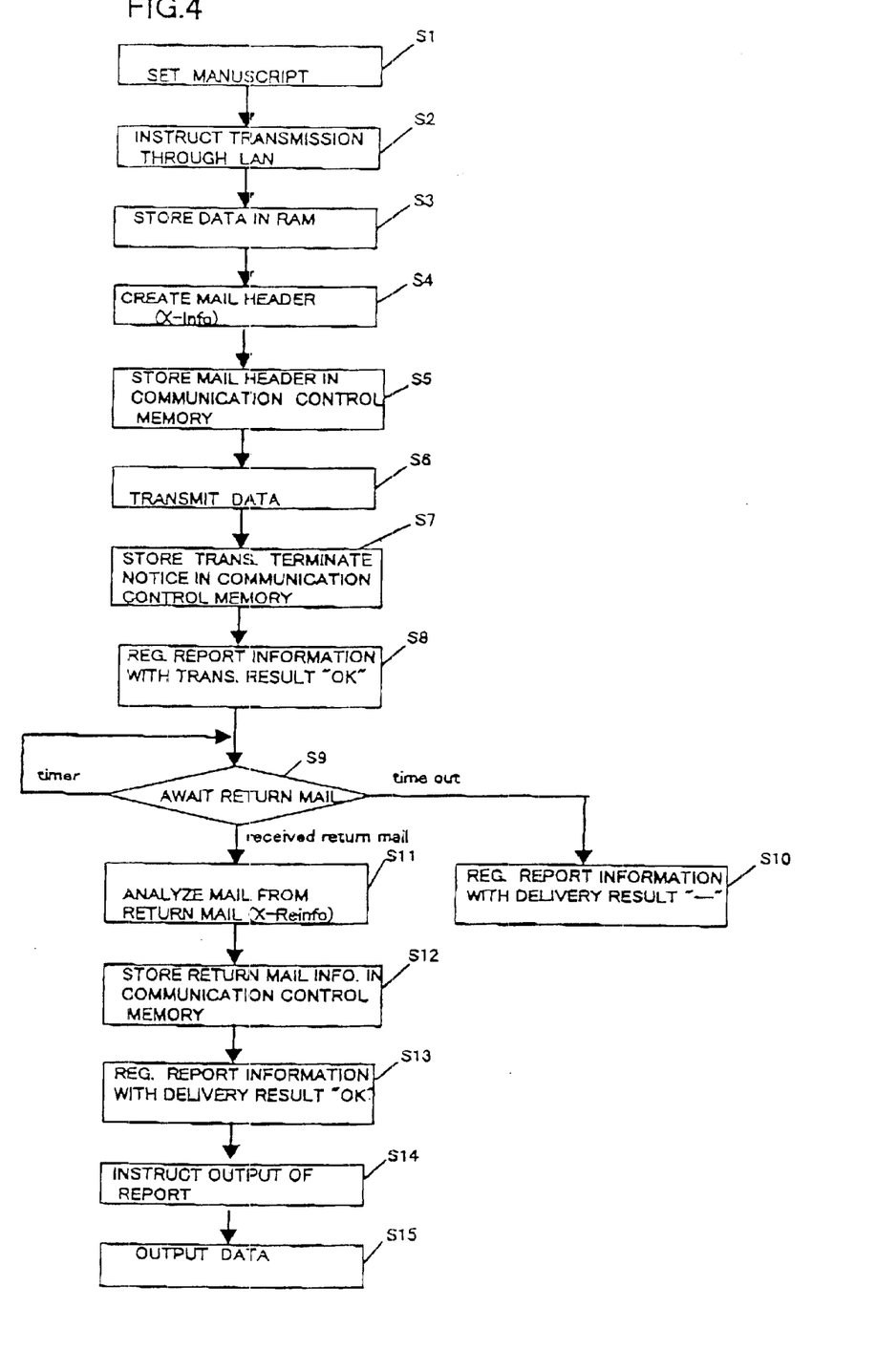
FIG. 4 is a flowchart illustrating a process including transmitting a mail and receiving a return mail in a transmitter-side communications apparatus of the present invention.

FIG. 4 is a flowchart illustrating a process including transmitting a mail and receiving a return mail in the communications apparatus of the present invention. In FIG. 4, "S" represents a step. An operation of the Internet facsimile machine shown in FIG. 3 is described with reference to FIG. 4.

In FIG. 4, S1 through S3 indicate steps for inputting image data, i.e., the steps where scanner 107 reads the image data, and a buffer memory 103 (hereinafter referred to as a RAM) stores the image data. These steps are detailed hereinafter. First at S1, a manuscript (e.g., a sheet of paper) containing an image to be transmitted is set in scanner 107, and is read by scanner 107. Compression and expansion section 108 compresses the read signals to produce compressed transmission image signals. Second at S2, an instruction to transmit the manuscript by a LAN through the Internet is input with the keys on operation panel 106. It is noted that transmission may occur within a LAN, or through both a LAN and the Internet, or solely through the Internet, even though it is being described as occurring through both the LAN and the Internet. Then at S3, RAM 103 stores transmission data in the form of transmission image signals. When the memory capacity of RAM 103 is small, the data can be stored in an external memory device 104. According to an alternate embodiment, the image data to be transmitted is produced by a personal computer instead of being read by scanner 107, and directly input to the facsimile machine.

Figure 5:
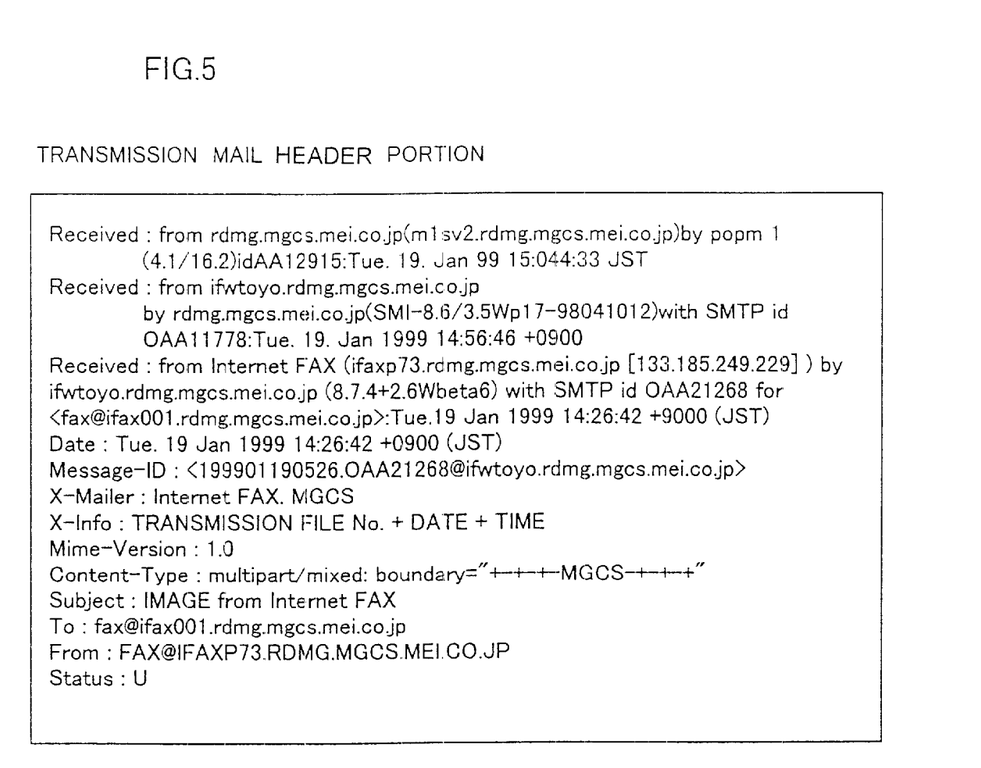
FIG. 5 depicts an example of a mail header of a transmitted mail, according to an aspect of the present invention.

Next, at S4, a sender's identification, i.e., mail header data (hereinafter called INFO), is produced. FIG. 5 shows a portion of a mail header of a mail to be transmitted. The INFO is produced in a known manner by a program stored in ROM (read only memory) 102 at the transmitter side using the information stored in an "X-Info" field. At S5, the INFO is stored in a transmission file of communication control memory 105, and a remark is attached to the manuscript in the file for identification purposes. Communication control memory 105 includes a transmission control table, such as the table shown in FIG. 6a, as well as a receipt control table, such as the table shown in FIG. 6b, and the INFO produced as discussed above is stored in the transmission control table in the form of a transmission file number, date, and time.

At S6, the INFO stored in the transmission file is attached to the header of the transmission data, thereby completing the mail to be transmitted. LAN controller 112 then transmits the mail to LAN line 113. When the transmission ends, a transmission time is measured, and at S7, a notice of transmission termination is stored in communication control memory 105. At S8, the transmission time and "OK" indicating a successful transmit result are recorded in a report, for example, file No. "00" and "01" shown in FIG. 6a, whereby completion of data transmission from an Internet communications apparatus to the destination, such as a server or another Internet communications apparatus, is confirmed at the sender's side.

At S9, the Internet facsimile apparatus awaits a return mail from the destination-side Internet communications apparatus. If the return mail does not arrive within a predetermined period measured by a timer, then at S10, the report of the file in control memory 105 is provided with "--", as shown in file No. "01" of FIG. 6a, and the file control terminates. In this case, the apparatus cannot confirm whether the mail arrived at the destination, therefore, the apparatus prompts the sender to confirm the delivery. This process applies mainly to transmitting apparatuses such as personal computers, rather than Internet facsimile machines.

When the apparatus receives the return mail at S9 within the predetermined period from the destination-side apparatus, the mail header information of the return mail is analyzed at S11. Subsequently, the data stored in an "X-Reinfo" field, shown in FIG. 7, is stored into control memory 105 at S12. An "OK" notice, indicating the successful delivery result, is registered in the file at S13, in this case, file No. "02", shown in FIG. 6a.

Figure 6A:
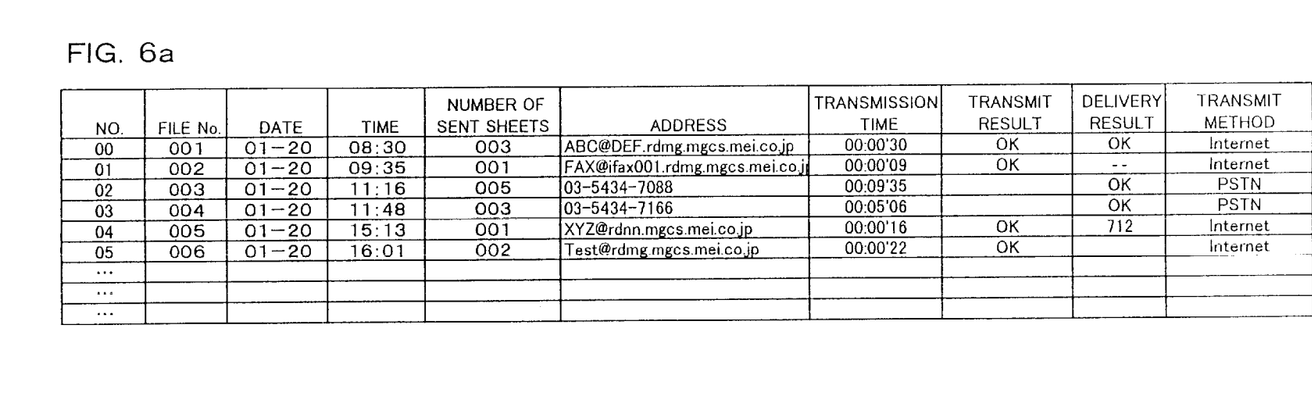
FIG. 6a illustrates a concept of a transmission control table in a communication control memory provided in a communications apparatus of the present invention.
Figure 6B:
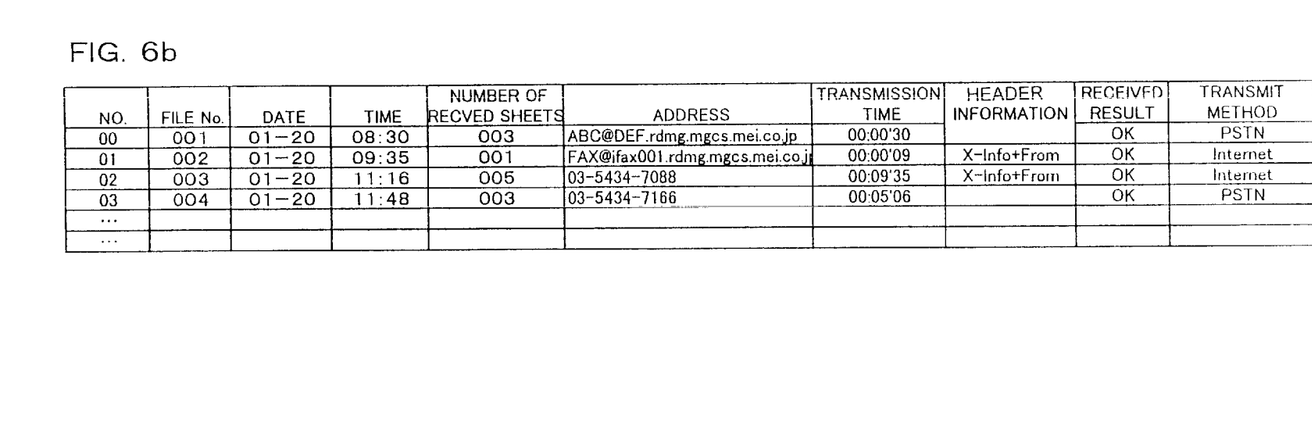
FIG. 6b illustrates a concept of a reception control table in a communication control memory provided in a communications apparatus of the present invention.
Figure 7:
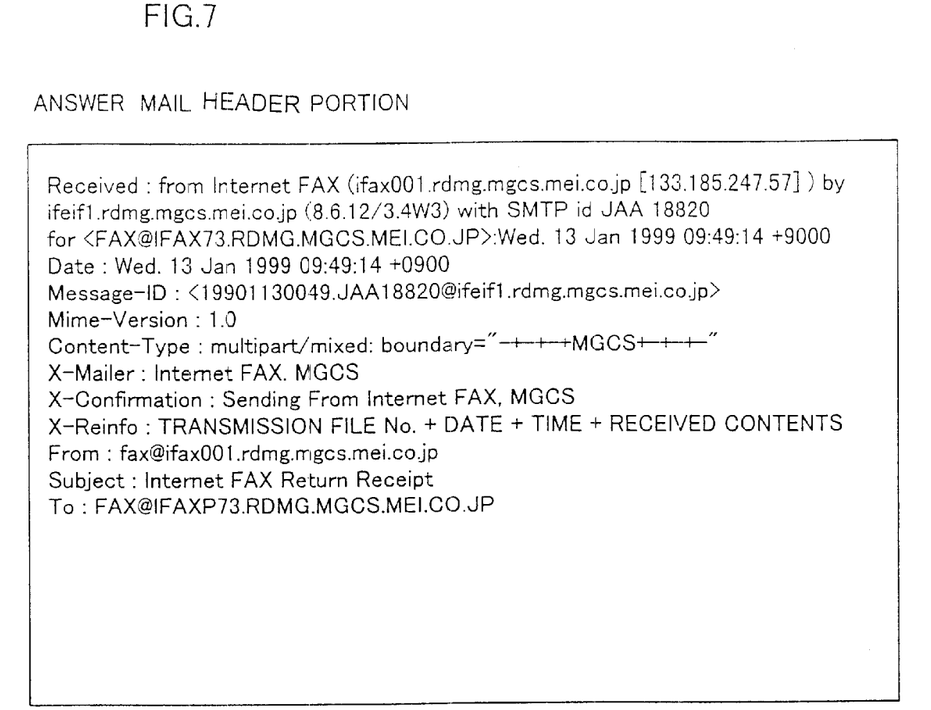
FIG. 7 illustrates an example of a mail header of a return mail, according to an aspect of the present invention.

If the return mail is an error message indicating that the transmitted mail was sent to a wrong address, an error code "712", as shown at file No. "04" in FIG. 6a, is attached to the file before the file is stored in memory 105 so that the file can be still monitored.

At file No. "05" in FIG. 6a, no remark is available in the delivery result column, which indicates that the file is awaiting a report. This status is still being monitored and is thus distinguishable from the time-out indication, i.e., "--".

Figure 8:
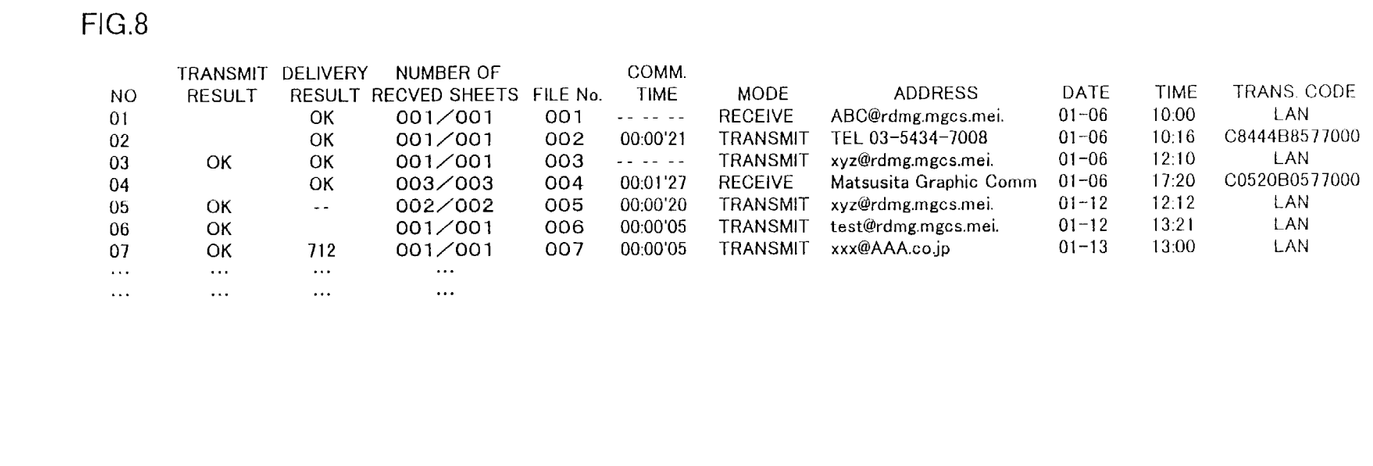
FIG. 8 illustrates an output of a communications control report, according to an aspect of the present invention.

Next, at S14, instructions are issued to output a communication control report on the transmission side, and at S15, the apparatus outputs the data, as shown in FIG. 8, on the display screen. The data on the screen can be printed out by printer 109 when necessary. Consequently, the user can monitor the transmission, as well as confirm the delivery result with ease by viewing an output report shown in FIG. 8, on the screen or in a printed form.

The operations or sequence discussed above are controlled by CPU 101.

Figure 9:
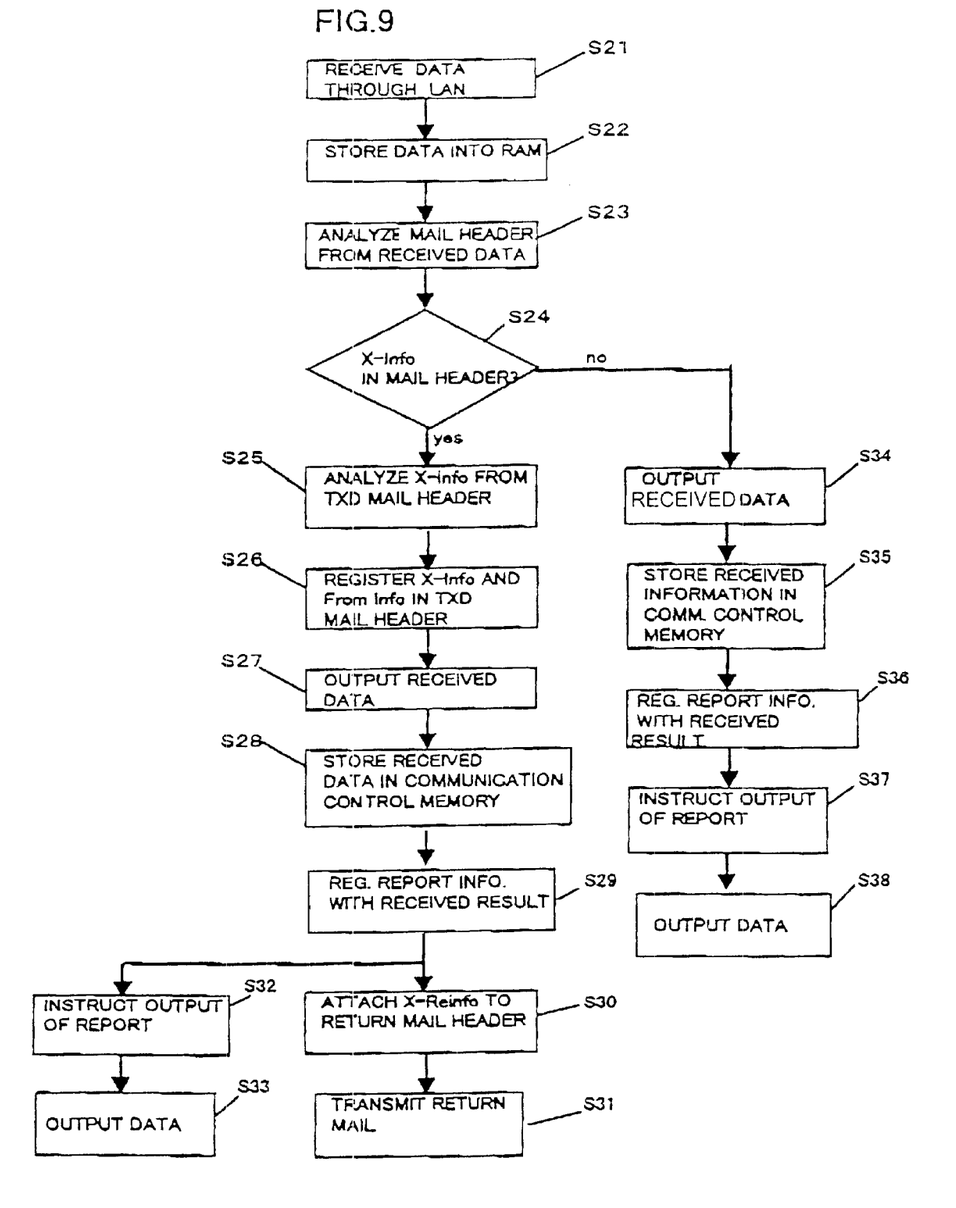
FIG. 9 is a flowchart illustrating a process including receiving a mail and outputting a confirmation of acknowledgment, according to an aspect of the present invention.

FIG. 9 is a flowchart illustrating a process of the destination-side Internet communications apparatus, including receiving data and transmitting an acknowledgment. At S21, the apparatus receives a mail through LAN line 113 and LAN communication controller 112, and at S22, stores the mail data in buffer memory 103. At S23 a mail header from the mail is analyzed, and it is then determined whether the mail header has any data in the "X-Info" field, at S24.

When the mail header does not have data in the "X-Info" field, the mail data is output at S34, and stored in memory 105 at S35. A report is generated at S36 and "OK" is indicated in the received result column shown in FIG. 6b. At S37, instructions to output the report are issued and the data is output on the screen at S38. The data can be printed out by printer 109 when necessary.

At S24, when the mail header has "X-Info" data, the "X-Info" data is analyzed at S25. Then this "X-Info" data and the sender's identification ("From" information) is registered at S26. This status is shown at file Nos. "01" and "02" in FIG. 6b. After the registration, the received data is output at S27, and the result is stored in memory 105 at S28. At S29, a report is generated and "OK" is indicated in the received result column shown in FIG. 6b. The output result is verified with the sender's "X-Info" data, and the verification result is attached as "X-Reinfo" to a header of a return mail at S30, as shown in FIG. 7. Finally, the apparatus transmits the return mail to the transmitter-side machine at S31. After S29, if necessary to output the report, instructions to output the report are issued at S32 and the data is output on the screen at S33. The data can be printed out by printer 109 when necessary.

The image data transmitted is stored in buffer memory 103, and compression/expansion section 108 restores the image data to the original image, which is then displayed on the screen, as well as printed out by printer 109 if desired.

The embodiment described above is for the case when data is transmitted and received via the Internet on a LAN line. This communications apparatus can also transmit and receive data as a conventional facsimile machine. In this case, an image is transmitted through PSTN line 111 via MODEM controller 110 to a facsimile machine at a destination side. An image transmitted from another machine to this apparatus is transmitted through PSTN line via MODEM controller 110 and stored in buffer memory 103 or outside memory 104, then printed out by printer 109.

Conventional facsimile communications are also controlled by using the control table in memory 105 in the same manner as described above. Thus, transceiving through the Internet on a LAN line and conventional facsimile communications can co-exist in the same control table. In other words, as file Nos. "02" and "03" in FIG. 6a indicate, on the control table in memory 105, the transmit method column indicates "PSTN". Thus, at least one of the transmit result column and the delivery result column indicates "OK". Thus, both types of communications can be controlled in the same table. In the case of receipt control, as file Nos. "00" and "03" in FIG. 6b indicate, the transmit method column indicates "PSTN" and the received result column indicates "OK". Thus, both types of communications can be controlled in the same table. When a control report is output, at least one of the transmit result column and the delivery result column indicates "OK", as shown at file Nos. "02" and "04" in FIG. 8.

As discussed above, the present invention provides a communications apparatus and a communication method through which image data is transmitted, and the transmit result as well as the delivery result are reported, even when communicating in a network such as the Internet or a LAN.

The communications apparatus and communication method of the present invention allow a sender to confirm a completion of transmission and delivery to a destination with ease and without fail. Therefore, the sender is free from cumbersome work such as requesting a receiver to acknowledge the mail or printing out a return mail from the receiver in order to confirm the acknowledgment.

While the invention has been described with reference to exemplary embodiments, it is understood that the words that have been used are words of description and illustration, rather than words of limitation. Changes may be made within the purview of the disclosure as presently stated and as amended, without departing from the scope and spirit of the invention in all of its aspects. Further, although the invention has been described with reference to particular means, materials, and embodiments, the invention is not intended to be limited to the particulars disclosed herein. For example, although the invention has been described as indicating a successful transmission occurred, a failed transmission can also be indicated through e.g., a "FAIL" in the transmit request column. Thus, the invention extends to all functionally equivalent structures, methods and uses. Although the present invention has been described in considerable detail with reference to certain preferred embodiments, other embodiments are possible. Therefore, the scope and spirit of the appended claims should not be limited to the description of the preferred embodiments contained herein.

What is claimed is:

1. A communication apparatus comprising:

an input system that inputs image data;

a transmitter that transmits the image data input by said input system to a predetermined destination, and upon successful completion of the image data transmission to the predetermined destination, generates a first notice indicating transmission completion, the transmitter and the predetermined destination being connected to an Internet;

a receiver that receives a reply from the predetermined destination in association with reception of the transmitted image data by the predetermined destination, and generates a second notice indicating reception result; and a memory that stores the first notice indicating that the transmission was successfully completed and the second notice indicating reception result by the predetermined destination, the first notice and the second notice being stored in correlation with each other.

2. The communication apparatus according to claim 1, further comprising an output section that outputs a communication report that includes the first notice and the second notice.

3. The communication apparatus according to claim 2, wherein said output section comprises a display section that displays the communication report.

4. The communication apparatus according to claim 2, wherein said output section comprises a printer that prints the communication report.

5. The communication apparatus according to claim 1, wherein the second notice comprises at least one of delivery result information that indicates that the reception by the predetermined destination was successfully completed, time-out information that indicates that the reception by the predetermined destination was not completed within a predetermined time period, and waiting status information that indicates that said receiver is awaiting information from the predetermined destination.

6. The communication apparatus according to claim 1, wherein said receiver receives an error code as the second notice when the reception by the predetermined destination has failed.

7. A communication method comprising:

inputting image data;

transmitting the input image data to a predetermined destination via the Internet;

generating a first notice indicating transmission completion upon successful completion of a transmission to the predetermined destination;

receiving a reply from the predetermined destination, in association with reception of the transmitted image data by the predetermined destination;

generating a second notice indicating reception result; and registering the first notice, indicating that the transmission was successfully completed, in correlation with the second notice, indicating reception result by the predetermined destination.

8. The communication method according to claim 7, further comprising outputting a communication report that includes the first notice and the second notice.

* * * * *